Sept. 16, 1958  W. G. PFANN  2,852,351
CONTINUOUS ZONE-REFINING
Filed June 25, 1957  5 Sheets-Sheet 1

INVENTOR
W. G. PFANN
BY
George S. Indig
ATTORNEY

Sept. 16, 1958 W. G. PFANN 2,852,351
CONTINUOUS ZONE-REFINING
Filed June 25, 1957 5 Sheets-Sheet 2

INVENTOR
W. G. PFANN
BY
ATTORNEY

Sept. 16, 1958 W. G. PFANN 2,852,351
CONTINUOUS ZONE-REFINING
Filed June 25, 1957 5 Sheets-Sheet 3

INVENTOR
W. G. PFANN
BY
ATTORNEY

Sept. 16, 1958

W. G. PFANN 2,852,351

CONTINUOUS ZONE-REFINING

Filed June 25, 1957

INVENTOR
W.G.PFANN
BY
*George S. Indig*
ATTORNEY

Sept. 16, 1958

W. G. PFANN

2,852,351

CONTINUOUS ZONE-REFINING

Filed June 25, 1957

INVENTOR
W. G. PFANN
BY
ATTORNEY

United States Patent Office 2,852,351
Patented Sept. 16, 1958

2,852,351

CONTINUOUS ZONE-REFINING

William G. Pfann, Far Hills, N. J., assignor to Bell Telephone Laboratories, Incorporated, New York, N. Y., a corporation of New York Application June 25, 1957, Serial No. 667,754

9 Claims. (Cl. 23—309)

This invention relates to processes for redistributing ingredients of fusible solute-solvent systems for the purpose of producing material of desired composition. The processes herein are continuous and utilize the zone-melting principles of United States Patent 2,739,088, issued March 20, 1956. In common with other zone-melting processes, the processes herein utilize variations in solute solubility in adjacent solid and liquid phases in the material being treated to effect redistribution of such solute and may be applied to systems of metals and their alloys; to salts and salt solutions, both organic and inorganic; and to other solute-solvent systems which can be caused to undergo a liquid-solid transformation.

The principles of and the universal applicability of the basic zone-melting processes are now well known to those skilled in the art. In the refining field alone these processes have found application to the treatment of a broad range of materials including such diverse members as semiconductive materials, such as silicon and germanium, and salts such as potassium nitrate and gallium trichloride.

However, the basic zone-melting processes as described in my above-designated patent are chiefly batch processes and as such have certain processing limitations inherent in all batch operations. It is the main purpose of this invention to adapt certain of the basic zone-melting principles to truly continuous operation. Use of the processes herein may result in a substantial economy in apparatus and in manpower where it is desirable to process a relatively large amount of material and has certain additional advantages which still further enhance the flexibility of the zone-melting processes in making practical operations that can be carried out only with difficulty by batch apparatus.

An important advantage in all continuous operations including the processes herein is that operation close to or at ultimate distribution is practical. Whereas in batch zone-refining it may be impractical to approach ultimate distribution since pass efficiency decreases as the number of passes increases, in continuous operation, it is economically feasible to utilize a long starting period in which the steady state is approached. Once such a state is attained, all subsequent material processed is necessarily processed under these steady state conditions thereby providing withdrawal of material having such ultimate composition virtually simultaneously with introduction of feed material. In such operation, provided there is a uniformity in feed composition, the intermediate material in the refiner serves merely as a vehicle for establishing the compositions at the outlets.

Other advantages of continuous zone-melting operation include the feasibility of crystallization from solvents. In such operation, materials A and B to be separated are fed into the apparatus dissolved in a common solvent C. Whereas in batch operation addition of such a solvent material would require continual addition at the start of each traversal of the zone, use of such a solvent material C in the continuous processes herein does not complicate operation and is merely added as a feed component.

Another advantage of the process herein is that a multicomponent system may be separated into three or more products, each of which is enriched with respect to a particular component so that an ABC system may be separated into three products, one enriched with respect to A, one with respect to B and one with respect to C.

For convenience, the processes of this invention are described in terms of a binary solute-solvent system in which it is generally assumed that the solute is the impurity to be removed and that $k$, the distribution coefficient defined as the ratio of the solute concentration in the solid freezing out of a molten zone to that in the liquid in the zone, is constant and is numerically less than 1. It is to be understood that such convention is for convenience only and that the solute may, under some circumstances, be the component with respect to which the desired product is enriched and that under other circumstances each of the two or more end materials may be a desirable end product. It is also to be understood that the processes herein work equally well in the treatment of systems in which one or more components has a distribution coefficient $k$ numerically greater than 1 and further that the invention is not to be limited to its application to binary systems. It is expected that these processes will find widespread use in the semiconductor field, for example, in the treatment of silicon or germanium alloyed with small portions of solute or solutes to which present theory ascribes the extrinsic semiconductive properties of the aforesaid materials by reason of which these materials are sometimes referred to as "significant impurities" or "significant solutes."

The processes of this invention accomplish the result of separating solute and solvent just as in that species of batch zone-melting sometimes referred to as "zone-refining" but in addition superimposes on the motion of the zones the material flows of feed, waste, and product. The apparatus used for the processes herein may be considered to be a column having an enriching section and a stripping section, much as in continuous distillation. In such a column feed is introduced intermediate the two sections and product and waste are drawn out at either end. As is described, the processes herein are further analogous to continuous distillation and are truly continuous in that the motion of the molten zones may be interpreted in terms of reflux and that by controlling certain parameters, reflux ratios may be controlled to result in the production of desired end compositions.

The processes of the present invention accomplish both forward and countercurrent flow without the necessity of any mechanical means except for the moving of heating surfaces in a single direction.

The processes of this invention are not the first such to adapt the zone-melting principles to continuous operation. Other such continuous processes include those described and claimed in my United States Patents 2,739,-045 and 2,739,046 both issued March 20, 1956. For convenience, in the description of the processes herein and to aid in distinguishing them over the processes of my earlier patents, these methods are referred to as "zone transport" zone-melting.

In its simplest embodiment, the processes of this invention utilize a substantially horizontal charge in an open top container having a product outlet near each of two extremities of the container and a product inlet at some position intermediate the two product outlets. In operation, feed material is added through the inlet in such manner that it results in inclination of the surface of the charge away from the inlet in the direction of each of the outlets. In causing a succession of molten zones to traverse the charge produced by one or more heaters and under the influence of gravity each zone in having a leveling influence on the molten material therein contained in itself acts as a vehicle of matter transport. It is this action which prompted the use of the name "zone transport." The above and other features of the invention will be more readily understood from the following detailed description when read with reference to the accompanying drawings in which:

In the description of the figures herein, the following assumptions are made:

(1) Zone travel is from left to right.
(2) One solute of concern has a distribution coefficient $k$ numerically less than 1.
(3) A desirable end product contains less of this solute than does the feed.

Figure 1A:
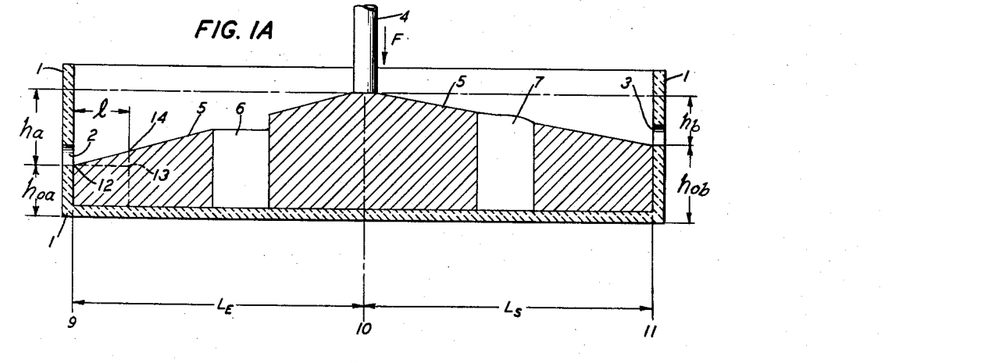
Figs. 1A and 1B are schematic front elevation and end views, both in section, of a simple single-stage zone transport process.

Referring again to Figs. 1A and 1B there is depicted a single-stage zone transport refiner in the steady operating state. The apparatus consists of a long open tray 1 having a product port 2 and a second product port 3 and also includes feed inlet 4. Under the above convention, product withdrawn at the right-hand port or port 3 in Fig. 1A is enriched with respect to solute and is, therefore, considered waste while material withdrawn from the left-hand port or port 2 of Fig. 1A containing less solute than does the feed material is considered product.

Figures 1B, 2A:
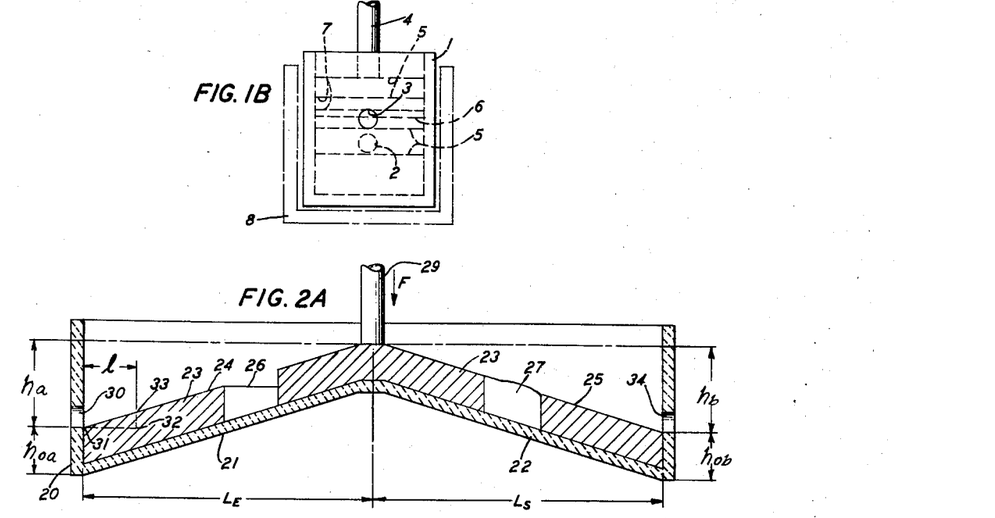
Figs. 2A and 2B are schematic front elevation and end views, both in section, of a variation in the zone transport process of Figs. 1A and 1B designed to maintain constant zonal volume.

Material 5 undergoing treatment is inserted into the apparatus through feed inlet 4 and molten zones 6 and 7 are caused to traverse this material from left to right by any convenient heaters such as heater 8 shown in Fig. 1B which heater moves from left to right with respect to tray 1.

A volume flow F of feed through inlet 4 maintians charge material 5 at height $h_a$ above product exit 2 and at height $h_b$ above waste exit 3. Under these conditions the steady state shape of the upper surface of charge 5 approximates a straight line in each direction from feed inlet 4 to product exit 2 and from feed inlet 4 to waste exit 3, the slope of which is $+h_a/L_E$ in the enriching section 9—10 and $-h_b/L_S$ in the stripping section 10—11. The volume flow per zone pass is given by the area of the dashed triangle 12—13—14 shown in the left-hand end of charge 5, this triangle representing the liquid that flows off when a molten zone of length $l$ such as zone 6 is at its starting position at the left end of tray 1.

Under the conditions set forth the volume flows per zone pass are:

$$P = h_a l^2 / 2 L_E \quad (1)$$

and $$W = h_b l^2 / 2 L_S \quad (2)$$

where $P$ = volume flow of product
$h_a$ = enriching head or height of charge 5 at feed inlet 4 over height of charge 5 at product port 2
$l$ = length of molten zone in direction of traversal
$L_E$ = length of charge between feed inlet and product 4 such as length 9–10 of charge 5
$W$ = volume flow of waste such as that through waste port 3
$h_b$ = stripping head or height of charge at feed position 4 over height of charge at waste port 3, and
$L_S$ = length of stripping section or charge length between feed position and waste port such as 10—11 of charge 5 with all quantities expressed in compatible units Under such circumstances flow P is opposite to zone travel while flow W is in the same direction as zone travel, although it should be noted that these directions are due solely to the convention set forth above. Volume flows P and W may be independently controlled by varying the parameters of heads, section lengths, zone lengths, and cross-sectional widths. In this connection, it should be noted that product and waste flow are not dependent on cross-sectional height although as will be discussed, this latter dimension is related to the composition of the product and waste.

The processes of this invention do not depend on matter transport due to density change and to simplify the discussion herein, it is assumed that such transport does not exist. It is, of course, recognized, that where there is a density change from the solid to the liquid phase, a small amount of matter may be transported by reason of the traversal of the molten zones themselves whether the process under consideration be a batch process or one of the processes herein. For example, in a germanium system in which the density of the liquid phase is greater than that of the solid, matter transport due to density change is in the direction of zone traversal.

The calculation of matter transport due to density change has been analyzed in the literature, see for example: W. G. Pfann, Transactions of A. I. M. E., volume 197, page 1441, 1953. The cited article also discusses critical tilt angles which may be utilized in the apparatus to eliminate this mechanism of matter transport if such be desired.

For reasons well known to those familiar with continuous processes using reflux, such as fractional distillation, it is considered desirable to increase the cross-section of the column in the direction of the feed inlet. The desirability of such variation in cross-section is suggested by the recognition that increased reflux flows take place as the feed inlet is approached. Optimum increase in such cross-section may be calculated. See, for example, M. Benedict, Multistage Separation Processes, Transactions of American Institute of Chemical Engineers, volume 43, page 41 (1947).

The processes of this invention in relying upon gravitational movement of molten material from the feed position in each of two directions down inclined planes toward outlet ports is readily adapted to increasing column cross-section in the direction of the feed inlet. The basic apparatus shown in Figs. 1A and 1B which utilizes a flat bottom tray inherently provides for such optimum column design, it being necessary only to provide for the proper charge slopes to obtain the desirable volume increase in the direction of the feed inlet. Further adjustment in cross-sectional variation may be secured by varying zone length and also by varying the width of the tray along its length.

Variation in zonal volume in the direction of the feed inlet is, however, not a necessary feature of this invention. Design variation which may result in constant zonal volume throughout the apparatus includes decreasing the width of the tray in the direction of the inlet, decreasing the length of the zones in the same direction and sloping the bottom surfaces of the tray so as to parallel the natural slope of the charge. Apparatus utilizing the latter design variation is depicted in Figs. 2A and 2B.

Figure 2B:
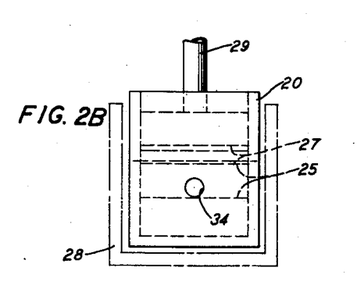

The apparatus depicted in Figs. 2A and 2B is identical in operation to that of Figs. 1A and 1B except that the bottom of tray 20 is sloped at 21 and 22 so as to parallel the sloping surfaces of charge 23 at 24 and 25 and thereby result in constant zone volume. As in the process of Figs. 1A and 1B, zones 26 and 27 are produced in charge 23 and are caused to traverse charge 23 under the influence of moving heaters such as heater 28 moving from left to right. Feed material is introduced in liquid, granular or other form through feed inlet 29 which may represent an outlet port of another refiner. Matter transport is carried out as in the process of Figs. 1A and 1B utilizing gravity flow and molten zones as vehicles. Each time a molten zone is at its starting position at the left-hand end of tray 20, molten material is withdrawn as product through product port 30, the amount of material being withdrawn being represented diagrammatically by triangle 31—32—33 for each zone of length $l$. Each time a zone such as zone 26 or 27 is at its terminal position at the right-hand end of tray 20, waste material is withdrawn through waste port 34. The same symbols for heads, enriching section lengths, etc. are used in these figures as in Figs. 1A and 1B so that the volume flows in this apparatus may also be calculated by use of Equations 1 and 2.

Ordinarily, the inclination of the upper surfaces of the charge in apparatus such as in Figs. 1A and 2A and the thermal conditions of processing are such that liquid material flow is confined to the molten zone of concern so that such material does not flow beyond the furthest interface of such zone. Even if such flow does occur, as it may where the inclination of the surface of the charge is great or where the temperature gradient at the furthest solid-liquid interface of the zone is small, any material flowing past the zone generally freezes on the upper surface of the adjacent solid material of the charge, thereby blocking further overflow. A small amount of such overflow, although it naturally impairs the efficiency of separation to a slight extent, is not generally of such severity as to necessitate undue precautions. However, where it is desirable to minimize such overflow, this may be done with a variation of the apparatus such as that depicted in Fig. 3. This problem is apt to be more severe in the section of the apparatus in which matter transport is in the direction of zone traversal, such as the right-hand or stripping section of the processes of Figs. 1A and 2A.

Figure 3:
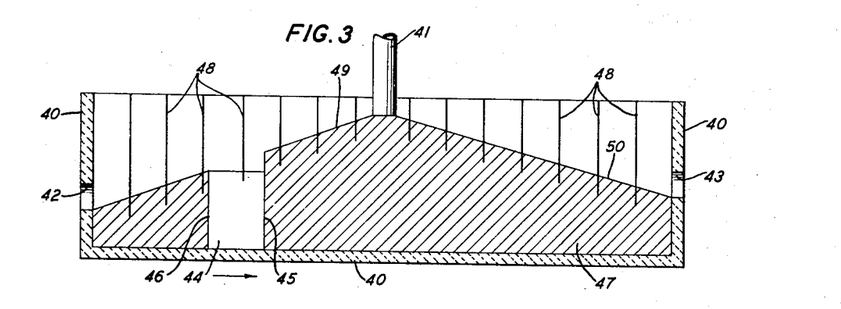
Fig. 3 is a front elevational view in section of a zone transport process such as that depicted in the preceding figures in which partitions are used for further controlling matter transport.

The process of Fig. 3 is similar to that of the preceding figures and is carried out in an apparatus consisting of a flat bottom tray 40, a feed inlet 41, a product port 42, a waste port 43 and heater or heaters, not shown, resulting in one or more molten zones 44 having leading interface 45 and trailing interface 46 moving through charge 47 from left to right. As in the preceding processes, feed is introduced through feed inlet 41 and product and waste are withdrawn through ports 42 and 43, respectively, each time a molten zone 44 is at the appropriate terminal position within the charge 47. As in all of the processes of this invention, matter transport is through gravity flow utilizing the moving zones such as 44 as vehicles. The apparatus depicted in this figure differs from that of the preceding figures in the inclusion of a series of vertical partitions 48 extending a short distance below surfaces 49 and 50 of charge 47. Such partitions, which may be made of any suitable non-contaminating material having a melting point substantially above that of the charge material 47, serve the purposes of preventing any substantial overflow of material down inclined surfaces 49 and 50 substantially past the downhill solid-liquid interface of zone 44 such, for example, as interface 46 of the molten zone 44 depicted.

Figure 4A:
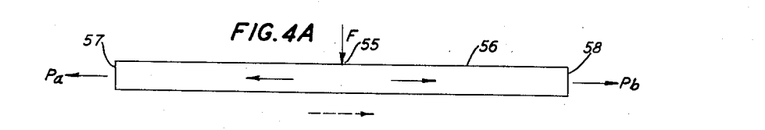
Figs. 4A and 4B are diagrammatic drawings indicating solute and material flow in a single-stage zone transport process.
Figure 4B:
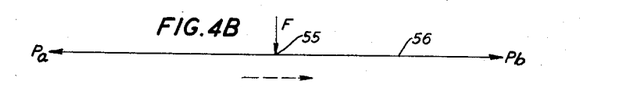

The zone transport apparatus and process of Figs. 1A and 1B can be represented as shown in Figs. 4A and 4B. In these diagrammatic representations feed, F, enters at some point 55 in column 56, end products $P_a$ and $P_b$ referred to as P and W in accordance with my convention, leaving at the left and right ends 57 and 58 of column 56, respectively. If feed F consists of a solvent A plus a small concentration of a solute B for which $k$ is less than 1, then $P_a$ will be leaner in B and $P_b$ will be richer in B than is the feed. In common with other continuous processes, efficient operation ordinarily requires that the feed be introduced at the point where its composition is about the same as that within the column.

Figure 5A:
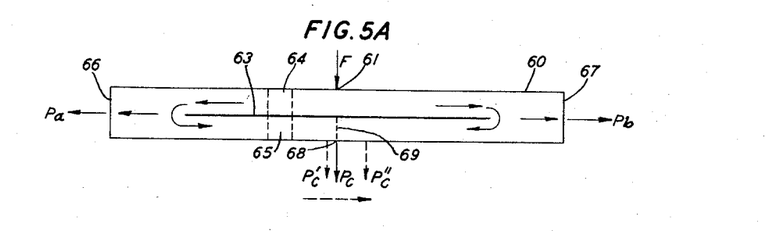
Figs. 5A and 5B are diagrammatic views showing material and solute flow in a typical two-stage zone transport process indicating withdrawal of three products each of which is enriched to a different feed component.
Figure 5B:
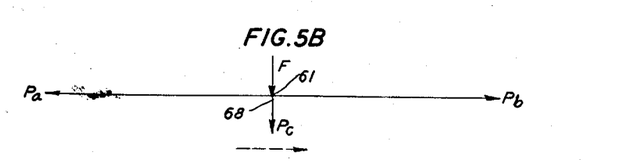

Figs. 5A and 5B are diagrammatic representations of a two-stage zone transport process, the use of which results in the separation of a three-component system. As an example, a feed F consisting of solvent A, small amount of solute B for which $k$ is greater than 1, and a small amount of a solute C for which $k$ is less than 1 is introduced into refiner 60 at feed inlet 61. Zone traversal in accordance with my convention is from left to right as indicated by the dashed arrows.

Partition 63 as shown extends through the entire cross-section of the refiner thereby avoiding contact between molten zone 64 and molten zone 65 during traversal along the length of the baffle. Under these conditions, product $P_a$ withdrawn from the left end of the refiner 66 is richer in B and product $P_b$ withdrawn from the right end of the refiner 67 is enriched with respect to component C. Enhancement of component B in $P_a$ necessarily indicates a reduction in the amount of component C therein contained. Similarly, product $P_b$ contains less component B than does the feed material. The second section of the refiner, that contained below partition 63 further redistributes the components of the compositions $P_a$ and $P_b$ so as to result in a third product $P_c$ withdrawn at 68 which product is enriched with respect to solvent A.

To visualize the second section of the refiner, it should be recalled that composition $P_a$ is made up primarily of solvent A plus solute B which latter has a segregation coefficient $k$ greater than 1 and composition $P_b$ is made up primarily of solvent A plus solute C which has a segregation coefficient less than 1. Considering composition $P_a$ separately, it is seen that left-to-right zone traversal of zone 65 through this material in the lower portion of the refiner below partition 63 results in a further concentration of component B in end region 66 of the refiner and a resultant enrichment with respect to solvent A at port 68. Similar left-to-right traversal by zone 65 in the lower right-hand portion of the refiner results in a further separation of the components of the composition of $P_b$ so as also to result in net movement of solvent A toward the product withdrawn at 68. As may be more readily visualized by reference to Fig. 6 to be described, matter transport in the second section of the refiner which is depicted schematically as that portion of the refiner below partition 63 in Fig. 5A is brought about by virtue of gravity flow of molten material within zones such as 65 down inclined slopes the lowest elevation of which corresponds with position 68 and the highest elevation of which corresponds with the positions of the lowest elevations of the inclined surfaces of that portion of the charge within the upper portion of the refiner. Although as depicted in that figure, the flows converging on position 68 are combined to produce product $P_c$, such combination is unnecessary so that two separate products both enriched in A with respect to compositions $P_a$ and $P_b$ may be removed from adjacent ports separated by partition 69 shown in Fig. 5A as a dashed line. If a partition 69 is used, the two products withdrawn on either side of this partition are represented by dashed arrows designated $P_c'$ and $P_c''$. It is, of course, not necessary that $P_c$ and F be at corresponding positions in the refiner, optimum placement of these ports depending upon the composition of the material being treated.

Figure 6:
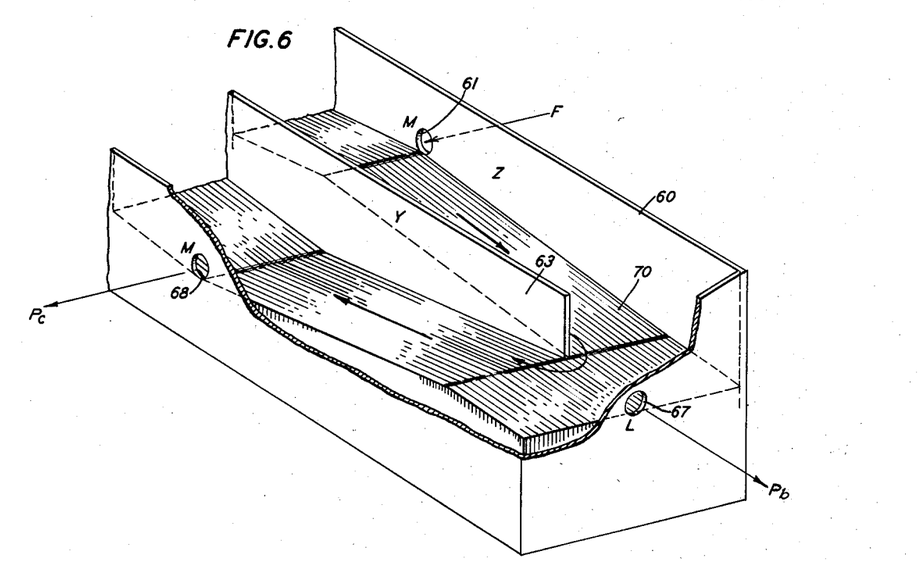
Fig. 6 is a perspective view of a section of a two-stage zone transport process and shows the effect of a baffle on material transport.

A perspective detail of apparatus in which the process of Figs. 5A and 5B is being carried out is shown in Fig. 6. The type of apparatus shown is of the open tray construction having an outer wall 60 and a center partition 63. Feed is introduced through port 61, product $P_b$ is withdrawn through port 67 and product $P_c$ is withdrawn through port 68. It is seen that the highest level of the charge material 70 corresponds with the feed position 61 and the lowest level corresponds with port position 68 while the material is at an intermediate level at port position 67. The upper surface of charge material 70 has opposite slope and different levels on either side of partition 63. The surface of the charge material 70 between the end of partition 63 and port 67 is common both for the first and the second sections of the refiner with a small but definite slope of the surface in this region corresponding to the small rate of withdrawal of material of composition $P_b$ through port 67.

Although the process of Figs. 5A, 5B and 6 has been described in terms of an ABC feed system in which it is desired to separate each of the three components, it may also be considered to be a binary BC system with segregation coefficients $k$ in a solvent material A such that addition of this solvent material A effects more complete separation. The depicted method in permitting removal of purified solvent material A permits a greater concentration of B and C to be removed at either end of the refiner.

Figure 7A:
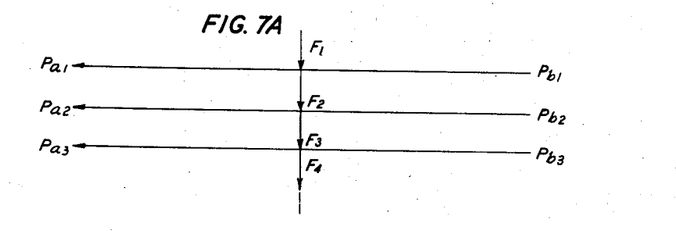
Figs. 7A and 7B are diagrammatic views showing material and solute flow in a multistage zone transport process.
Figure 7B:
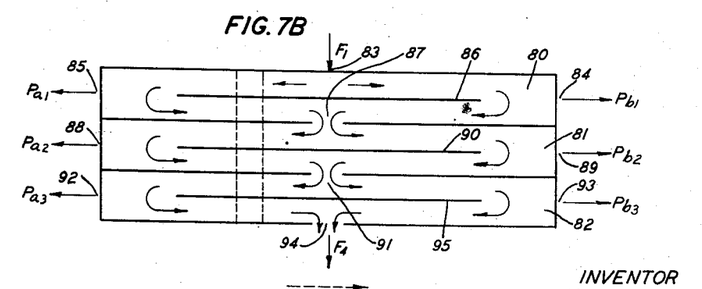
Figure 8:
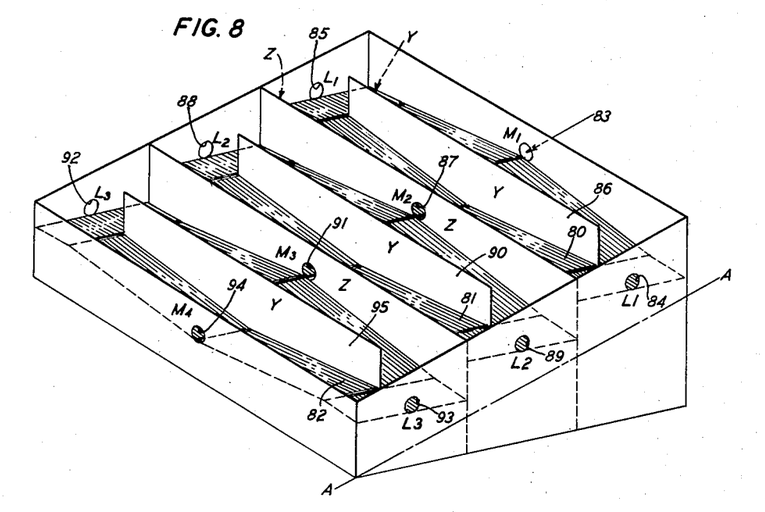
Fig. 8 is a perspective view of apparatus suitable for use in a multistage process such as that of Figs. 7A and 7B.

For some systems, unless the flow rate is very small compared to the zonal reflux flow, product $P_c$ withdrawn in the process of Fig. 6 is still susceptible to further enrichment with respect to solvent A. Under such circumstances double-section refiners such as that of Figs. 5A, 5B and 6 may be cascaded so as to result in further purification of this solvent material. Figs. 7A, 7B and 8 are diagrammatic and schematic views of process and apparatus in which there is a triple cascade of such double-section apparatus. This apparatus is mde up of three two-section refiners 80, 81 and 82, each of which operates in the fashion of that of Fig. 6 with the third product material of each of the cascades acting as a feed material for the subsequent cascade. In common with the other processes of this invention all flows are controlled directly by the differences in head between the ports. A feed material containing solvent A as a major component and also containing solute B having a segregation coefficient greater than 1 and solute C having a segregation coefficient less than 1, is introduced through feed port 83 and is designated $F_1$ for the purposes of Figs. 7A and 7B. The surfaces of this charge material are inclined downwardly within the first half of first cascade 80 in the direction of both ports 84 and 85. With zone traversal from left to right, product withdrawn through port 84 is enriched with respect to solute C, and product withdrawn through port 85 is enriched with respect to solute B. The surface of the material undergoing treatment in the lower or second portion of first cascade 80 below partition 86 is sloped with the highest elevations at positions corresponding with the two ends of partition 86 and with the lowest elevation corresponding with the position of port 87. Material flowing through port 87 is enriched with respect to solvent A.

This material is now considered to be a second feed material designated $F_2$ in Fig. 7A introduced into second cascade refiner 81. Assuming products $P_{a2}$ and $P_{b2}$ withdrawn respectively through ports 88 and 89 are of the identical composition as respectively products $P_{a1}$ and $P_{b1}$ withdrawn through ports 85 and 84 of first cascade refiner 80. Under these circumstances zone traversal through second half of refiner 81 below partition 90 results in a flow of material through port 91 further enriched with respect to solvent material A.

For the refiner depicted in Fig. 8 the process is again repeated in third cascade refiner 82 considering product withdrawn through port 91 as $F_3$, thereby resulting in products $P_{a3}$ withdrawn through port 92 having the composition of the products $P_{a1}$ and $P_{a2}$, product $P_{b3}$ withdrawn through port 93 having the composition of products $P_{b1}$ and $P_{b2}$ and third product designated $F_4$ withdrawn through port 94 from the second half of cascade refiner 82 below partition 95 still further enriched with respect to solvent material A.

Although for simplicity the multicascade process is discussed in terms of flow conditions resulting in equal composition A products and equal composition B products this is not a necessary condition of the process. The effect of flow conditions on such compositions is discussed further on.

The following flow schedules are presented to indicate the degree of separation that may be obtained by use of the three-cascade process of Figs. 7A, 7B and 8. All values given are estimates and are based on a particular hypothetical ternary system. The ternary system hypothesized is one which is comprised mainly of component A and which also contains small quantities of a solute B having a segregation coefficient $k$ greater than 1 and solute C having a segregation coefficient $k$ less than 1. Solutes B and C are present in equal concentrations and segregate equally in opposite directions in the refiner. For the purpose of these schedules flow rate $F_1$ is 100 volumes per unit time. The feed composition $C_f$ of each of the two solutes is 0.2 percent by volume so that $C_f(B)$ equals $C_f(C)$ equals 0.2 percent by volume. The symbols used in the following schedules are those of Figs. 7A and 7B.

SCHEDULE 1

The volumes of A, B and C in $F_1$ and $99.6A + 0.2B + 0.2C = 100$. Assuming appropriate placement of ports 87, 91 and 94 and appropriate amounts of products withdrawn, the compositions of products $P_{a1}$, $P_{a2}$ and $P_{a3}$ are identical as are the compositions of $P_{b1}$, $P_{b2}$ and $P_{b3}$. The design of the apparatus used in this schedule is such that each of the products $P_{a1}$, $P_{a2}$ and $P_{a3}$ contains 10 percent of B and a negligible amount of C and in such that each of products $P_{b1}$, $P_{b2}$ and $P_{b3}$ contains 10 percent of C and a negligible amount of B. Letting $P_{a1} = P_{b1} = 1$ volume:

$P_{a1} = 0.9A + 0.1B = 1.0$ volume
$P_{b1} = 0.9A + 0.1C = 1.0$ volume
$F_2 = 97.8A + 0.1B + 0.1C = 98$ volumes containing about 0.1 percent of A and about 0.1 percent of B.

Withdrawing $P_{a2}$ and $P_{b2}$ at 10 percent concentration of solutes B and C respectively, and at volumes half as great as those of $P_{a1}$ and $P_{b1}$;

$P_{a2} = P_{b2} = 0.5$ volume
$P_{a2} = 0.45A + 0.05B = 0.5$ volume
$F_3 = 96.9A + 0.05B + 0.05C = 97$ volumes containing about 0.05 percent of B and about 0.05 percent of C.

Again withdrawing half of the amounts of B and C contained in $F_3$;

$P_{a3} = P_{b3} = 0.025$ volume
$P_{a3} = 0.225A + 0.025B = 0.25$ volume
$F_4 = 96.45 + 0.025B + 0.025C = 96.5$ volumes containing about 0.025 percent of solute B and 0.025 percent of solute C.

Under the conditions set forth above, it is seen that in three continuous stages cascaded at the feed point the impurity content of A withdrawn at port 94 as $F_4$ has been reduced by a factor of about 8, while products enriched in B and also products enriched in C are withdrawn simultaneously. In schedule 1 above, the decreasing flow rate in each successive refiner is of assistance in securing the relative enrichment of B and C realized in each successive stage. Under some circumstances to realize the enrichment indicated, it may be necessary to provide increasing column length in successive stages. Such an apparatus may resemble that of Fig. 8 except that the general shape of the tray would be trapezoidal with the broad base corresponding with that wall of the tray containing port 94 or may be circular with successive circular baffles and walls defining successively later stage and lower level refining from the center outwardly. The following schedule is similar to that of schedule 1 except that the process is so arranged that the volume of the products $P_{a1}$, $P_{a2}$ and $P_{a3}$ and also of $P_{b1}$, $P_{b2}$ and $P_{b3}$ are equal. Under these circumstances the concentrations of successive A products and also of successive B products are not constant, but decrease with respect to solute of concern.

SCHEDULE 2

Using the same hypothetical ternary system as that of schedule 1 and with a withdrawal program resulting in equal flows of A and B products of the same relative enrichment:

$F_1 = 99.6A + 0.2B + 0.2C = 100$ volumes containing 0.2 percent of B and 0.2 percent of C $F_2 = 97.8A + 0.1B + 0.1C = 98$ volumes containing about 0.1 percent of B and 0.1 percent of C $F_3 = 95.9A + 0.05B + 0.05C = 96$ volumes containing about 0.05 percent of B and 0.05 percent of C $F_4 = 93.95A + 0.025B + 0.025C = 94$ volumes containing about 0.027 percent of B and 0.027 percent of C It is seen that this flow schedule results in A and B products averaging less solute than those of schedule 1 while $F_4$ is not quite as pure with respect to A as is that product of schedule 1.

Figure 9A:
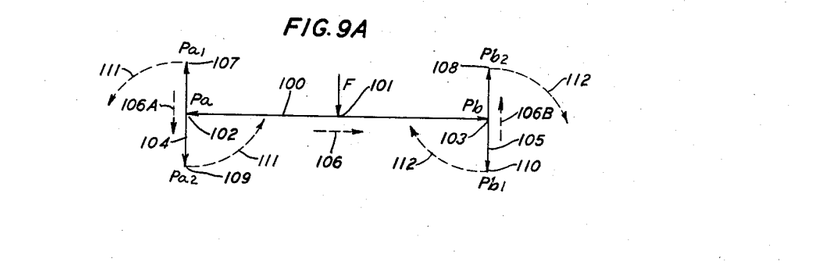
Figs. 9A and 9B are diagrammatic views of material and solute flow in a two-stage process.
Figure 9B:
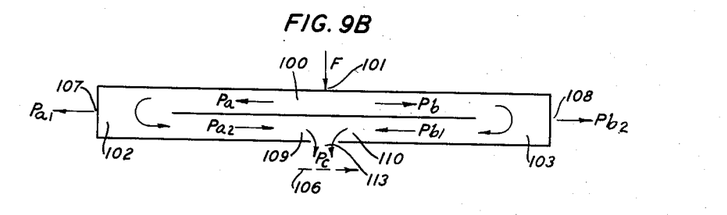

If partition 63 in Fig. 5A is shorter than receptacle 60 and does not touch it at either end, the two-stage refiner is equivalent to three single-stage refiners operated in cascade as shown in Figs. 9A and 9B. In the diagram of Fig. 9A feed F enters the middle refiner 100 through feed inlet 101, products $P_a$ and $P_b$ leaving refiner 100 at positions 102 and 103, respectively, thereby becoming feeds for left-hand refiner 104 and right-hand refiner 105. Zone traversal directions are indicated by dashed arrows 106, 106A and 106B. With this arrangement solutes having segregation coefficients less than 1 are concentrated in product $P_{a1}$ withdrawn at 107 and solutes having segregation coefficients greater than 1 are concentrated in product $P_{b2}$ withdrawn at 108. In Fig. 9A products $P_{a2}$ withdrawn from position 109 and $P_{b1}$ withdrawn at 110 are enriched with respect to solvent material.

Fig. 9B is equivalent to Fig. 9A as visualized by rotation of refiners 104 and 105 suggested by the dashed arrows 111 and 112. Having rotated refiners 104 and 105 through an angle of 90 degrees as indicated, it is seen that all zone traversal indicated by dashed arrows 106, 106A and 106B is from left to right. If products $P_{a2}$ and $P_{b2}$ both enriched with respect to solvent material are combined to form product $P_c$ as withdrawn through port 113 in Fig. 9B, we have the arrangement shown in the latter figure.

Figure 10A:
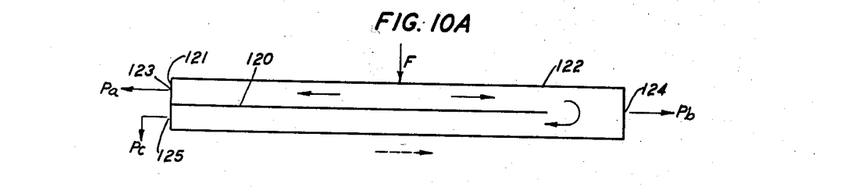
Figs. 10A and 10B are diagrammatic views showing such flows in a two-stage process alternate to that of Figs. 9A and 9B in which a different baffle arrangement results in a greater separation between two of the product flows.
Figure 10B:
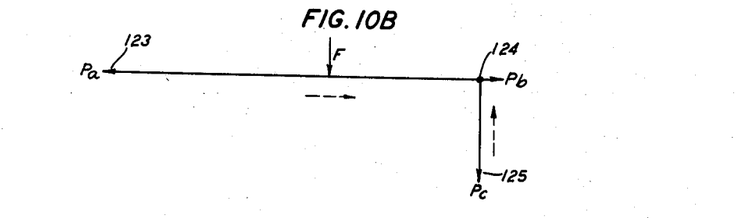

Figs. 10A and 10B depict a variation in the two-stage refiner. In this variation baffle 120 extends to wall 121 of refiner 122 thereby permitting further isolation of product $P_c$ from feed F and products $P_a$ and $P_b$. In the ABC system discussed in connection with Figs. 5A and 5B, $P_a$ withdrawn at 123 is rich with respect to solute B having a segregation coefficient greater than 1. Product $P_b$ withdrawn through port 124 is enriched with respect to solute C having a segregation coefficient less than 1 while product $P_c$ withdrawn through port 125 is considerably purer than feed F with respect to solute C by virtue of its greater distance from port 124. However, assuming equal segregation of each of solutes B and C, product $P_c$ is less pure than feed F with respect to solute B. Although such a variation may not be advantageous in such an ABC system, it is favored where B separates more readily from A than does C. The equivalent diagram is shown in Fig. 10B.

Figure 11A:
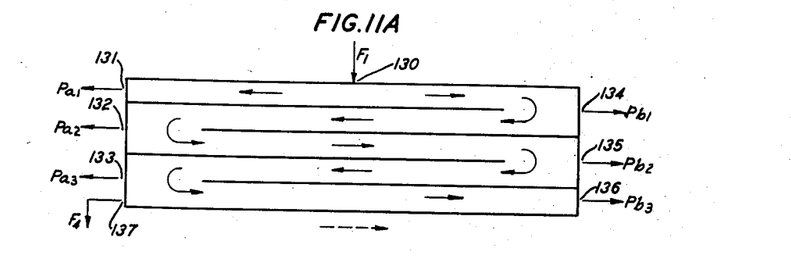
Figs. 11A and 11B are diagrammatic views of a multistage process utilizing the baffle arrangement of the process of Figs. 10A and 10B.
Figure 11B:
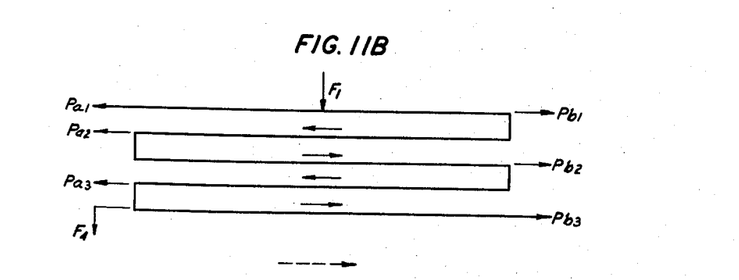

The arrangement depicted in Figs. 11A and 11B is a cascade of two and one-half two-section refiners having the baffle arrangement of the apparatus of Figs. 10A and 10B. Using such an arrangement, schedules, such as schedule 1 and schedule 2 above, may readily be computed. With such a system and assuming half volume withdrawals with each succeeding A product and also with succeeding B product, feed at 1 introduced at 130 comprising an ABC system as above, results in products $P_{a1}$, $P_{a2}$ and $P_{a3}$ withdrawn at 131, 132 and 133 enriched with respect to B, products $P_{b1}$, $P_{b2}$ and $P_{b3}$ withdrawn respectively at 134, 135 and 136 all enriched with respect to solute C while third product designated $F_4$ withdrawn at 137 is enriched with respect to A containing a relatively small amount of solute C and a greater amount of solute B than does product $F_4$ of Fig. 7B with the same segregation coefficients in the same amounts. This species is valuable where the system is such that the segregation coefficient of B is more favorable than that of C.

The following discussion relates to design considerations and equations to be taken into account in the design of zone transport apparatus. Illustrative calculations indicating flows and composition of end products under given circumstances are also presented.

Design problems in the zone transport process of zone-melting are similar to those of other continuous two-phase processes such as fractional distillation, and it is to be expected that any person familiar with design parameters of any such process may design efficient zone transport apparatus by making certain suitable substitutions in known design equations. It is the primary purpose of this section to indicate which parameters are of significance in the development of design equations for these purposes. For many purposes, the processes of the instant invention resemble those of my prior art Patent 2,739,045. Suitable design equations for use with this earlier continuous zone-melting process sometimes referred to as "zone void melting" are set forth in Journal of Metals, volume 7, pages 297 through 303, February 1955. Those equations may under certain circumstances be applied directly to the design of zone transport apparatus. Reference is made to such zone void equations herein.

Since the nature of the basic zone void process is such that under steady state conditions the volume of a molten zone remains constant during traversal, the species of zone transport process discussed herein is one in which such constant volume is maintained. The species chosen for this purpose is that depicted in Figs. 2A and 2B. In order to apply the usual zone void equations directly, it is necessary also that matter transport be confined to flow which does not override the solid-liquid interface. Conditions of overflow have been considered above and, as has been described, where such overflow is significant, it may be minimized by use of partitions such as those of the apparatus of Fig. 3. Even where these two assumed conditions do not obtain, that is, where there is a variation in zone volume during traversal, or where there are overflow conditions, such that matter transport is not confined to the area bounded by molten-liquid interfaces over the surface of a molten zone, the equations herein serve, as a reasonable first approximation. Where the volume of the molten zone increases as the feed inlet is approached, it is to be understood that the separation efficiency is somewhat greater than that indicated by the equations herein so that they are conservative approximations. Where overflow is significant, the degree of separation indicated by these equations is somewhat better than that which is obtained in practice so that if such overflow conditions obtain and if they are not sufficiently reproducible to permit development of precise equations taking this into account, a safety factor should be introduced into these equations. The magnitude of such a safety factor depends primarily on the percentage of matter transport susceptible to overflow and the distance of overflow. As an example, assuming overflow approximately equal to 50 percent of total matter transport for an average distance of approximately one zone length, a safety factor of the order of one or two extra zone lengths in the column section length, $L_E$ or $L_S$, is appropriate.

The first equation presented below is a material balance equation which obtains for all truly continuous processes:

$$F = W + P \quad (3)$$

$W$ = waste flow
$P$ = product flow

If the flows are properly coordinated, where possible, as in the usual binary system, the feed position corresponds with the column position containing material of composition $C_f$ in which this symbol indicates feed composition. In common with other continuous processes, optimum separation is obtained under this condition and it is assumed to apply in the following discussion. It is, of course, not to be assumed that this condition is necessary to the operation of the processes of this invention since any variation in composition of the material within the column at the feed position merely reduces the efficiency of separation and has no effect on the actual mechanism.

The ratio $P/W$ depends on $C_p$ and $C_w$, the concentrations of solute of concern in the product and waste respectively as follows:

Let
$$C_p = \alpha C_f \quad (4)$$
and
$$C_w = \beta C_f \quad (5)$$

where $\alpha$ and $\beta$ are constants.

From Equations 3, 4 and 5 and a solute balance, the following is obtained:

$$P/W = (\beta - 1)/(1 - \alpha) \quad (6)$$

The ratio $P/W$ may be controlled by varying the horizontal dimension of the column section, the zone length, the pitch, the zone spacing or the travel rates. The expressions for $P$ and $W$ in terms of zone length $l$, head $h$ and column section length $L$ have already been given, see Equations 1 and 2 above.

ENRICHING SECTION EQUATIONS

Given a feed composition $C_f$ a solute segregation coefficient $k$ and a desired product composition $C_p$, the length of the enriching section $L_E$ may be calculated on the basis of a selected zone length and matter flow per zone by use of the following equations:

$$L_e = \frac{1}{(0.434)B_E} \log \left\{ \omega \left[ \frac{\psi}{\alpha} - 1 \right] \right\} \quad (7)$$

where
$B_E$, $\omega$ and $\psi$ are constants, depending on $l$, $P$ and $k$, and are given by:

$$e^{B_E(l+P)} = 1 + B_E l/k \quad (8)$$

$$\omega = \frac{k}{(1-k)B_E l} [1 - e^{B_E P}] \quad (9)$$

$$\psi = k + \frac{(k-1)l}{P} \quad (10)$$

and in which $P$ is defined in Equation 1.

These equations place certain restrictions on the value of $\alpha$ that can be attained. These are summarized in Table I which follows:

Table I
LIMITS OF THE PURIFICATION RATIO, $\alpha$, FOR THE ENRICHING SECTION

| Value of $k$ | Range of— $L_E=0$ | Range of— $L_E=\infty$ | Range of $\psi$ | Range of $\omega$ | Sign of $B_E$ |
|---|---|---|---|---|---|
| $k < \frac{l}{l+P}$ | $\frac{\omega\psi}{1+\omega}$ | 0 | 0 to $-\infty$ | $-1$ to 0 | (+) |
| $\frac{l}{l+P} k < 1$ | $\frac{\omega\psi}{1+\omega}$ | $\psi$ | 0 to $k$ | $< -1$ | (−) |
| $k > 1$ | $\frac{\omega\psi}{1+\omega}$ | $\psi$ | $k$ to $+\infty$ | $> 0$ | (−) |

The following calculation is illustrative of the use of the above equations in determination of a required enriching section length $L_E$ for given head, molten zone length segregation coefficient, and desired product, $P$.

ILLUSTRATION CALCULATION 1

Given $l = (0.8)$, $P = (0.2)$ and $k = 0.5$, find the required section length $L_E$ for a desired purification factor, $x$, of 0.01. From Equation 8 $e^{B_E(1)} = 1 + B_E(0.8)/(0.5)$.

$$B_E = 0.87$$

From Equation 9

$$\omega = \frac{0.5}{(0.5)(0.87)(0.8)} \cdot (1 - e^{0.87(0.2)}) = -0.27$$

From Equation 10

$$\psi = 0.5 - \frac{(0.5)(0.8)}{(0.2)} = -1.5$$

From Equation 7

$$L_E = \frac{1}{0.434(0.87)} \log \left\{ -0.27 \left[ \frac{-1.5}{0.01} - 1 \right] \right\} = 4.2 \text{ zone lengths}$$

EQUATIONS FOR STRIPPING SECTION

A corresponding set of equations for the determination of the length of the stripping section $L_S$ follow:

$$L_S = \frac{1}{0.434 B_S} \log \left[ \frac{\beta\delta - k}{\gamma} + 1 \right] \quad (11)$$

where $B_S$, $\delta$, and $\gamma$ are constants depending on $l$, $W$, $k$, and $\beta$, and are given by:

$$e^{B_S(l-W)} = 1 + B_S \cdot \frac{l}{k} \quad (12)$$

$$\delta = k \left( \frac{W}{l} \right)^{1-k} \quad (13)$$

$$\gamma = \frac{B_S [W\beta - l(1-k)]}{1 + B_S l - e^{B_S l}} \quad (14)$$

and $W$ is defined in Equation 2 above. Restrictions placed on the values of $\beta$ by Equations 11 through 14 are summarized in Table II.

Table II
LIMITS OF $\beta$ FOR STRIPPING SECTION

| Value of $k$ | Range of $\beta$ $L_S=0$ | Range of $\beta$ $L_S=\infty$ | Sign of $\gamma$ | Sign of of $B_S$ |
|---|---|---|---|---|
| $k < 1$ | $k/\delta$ $k/\delta$ | $l(1-k)/W$ $l(1-k)/W$ | (+) if $\beta < l(1-k)/W$ (−) if $\beta > l(1-k)/W$ | (+) (+) |
| $1 < k < \frac{l}{l-W}$ | $k/\delta$ | 0 | (−) | (+) |
| $k > \frac{l}{l-W}$ | $k/\delta$ | $(k-\gamma)/l\delta$ | (+) | (−) |

The following calculation illustrates the use of Equations 11 through 14 in determining the required section length $L_S$ for obtaining a given waste composition W.

ILLUSTRATIVE CALCULATION 2

Given $l=1$, $W=0.1$ and $k=0.5$, and desiring a $\beta$ equal to $C_W/C_j=4.8$, the required stripping section length $L_S$ is calculated as follows:

From Equation 12:

$$e^{B_S(0.9)} = 1 + B_S \cdot \left(\frac{1}{0.5}\right)$$

$$B_S = 1.40$$

From Equation 13:

$$\delta = 0.5\left(\frac{0.1}{1}\right)^{0.5} = 0.158$$

From Equation 14

$$\gamma = \frac{1.4[(.1) \times (4.8) - (1) \times (.5)]}{1 + 1.4 - 4.05} = +0.017$$

From Equation 11

$$L_S = \frac{1}{(0.434)(1.40)} \log \left[\frac{(4.8)(0.158) - (0.5)}{(0.017)} + 1\right] =$$

2.0 zone lengths

The following discussion relates to practical considerations to be taken into account in the operation of the processes herein. Since most of these considerations are identical to those of either batch zone-melting or my continuous zone-melting process described in Journal of Metals, volume 7, pages 297 through 303, February 1955, reference may be had to such descriptions where greater detail is required.

The processes herein are not described in terms of specific solvent-solute systems. Systems to which these processes are applicable include all those containing at least two ingredients in which at least one ingredient has a segregation coefficient, either greater than or less than unity, and further which material may be caused to undergo a phase transformation from solid to liquid and back to solid without resulting in a change which is deleterious from the standpoint of a particular processing objective. Materials which meet this latter requirement are herein referred to as "fusible." Segregation coefficients for a wide range of materials are available in the literature by reference to constitutional diagrams of the system or by use of known methods by which such values may be obtained from thermodynamic considerations. See for example, A. Hayes and J. Chipman, Transactions A. I. M. E., volume 135, page 85, 1939.

As is known, effective values of $k$ under actual solidification conditions generally deviate from the equilibrium values. Effective values, where they do so deviate, invariably approach unity thereby decreasing the efficiency of separation for any process depending upon such factors for this purpose. Deviation from equilibrium value is brought about by poor diffusion of the solute in a molten region and by any significant diffusion in the solid region. Various means of causing the effective value of $k$ to approach the equilibrium value and, thereby, of improving separation efficiency include stirring and molten region, decreasing the rate of crystallization so as to avoid entrapment of solute in the solid region, and increasing the temperature gradient at the trailing liquid-solid interface.

Effective $k$ values for various binary systems have been reported in the literature, see for example, Hayes and Chipman, supra, for $k$ values of various solutes in iron; W. G. Pfann Journal of Metals, volume 4, page 861 and R. N. Hall, Physical Review, volume 88, page 139 for Solutes in Germanium; R. H. McFee, Journal of Chemical Physics, volume 18, page 856 for Solutes in Sodium Chloride and J. Pauly and P. Sue, Comptes Rendus, volume 244, page 1212 (1957) for Solutes in Potassium Nitrate.

Since the degree of separation for given apparatus dimensions depends only on the number of zone lengths in the column section for given flow conditions, any degree of separation made possible by a given $k$ value can be accomplished by a minimum of one molten zone corresponding with a single heater in the refiner. However, a time saving is realized if heaters are spaced together as closely as possible. The ultimate limit on the number of heaters on a given section is, of course, the maximum number which result in the maintenance of a solid plane of material at some position intermediate two heaters. Other conditions which may impose a minimum on such heater spacing even where such a solid bridge of material is maintained include the necessity of heat exchange conditions such as to preclude a solid diffusivity rate approaching that in the liquid. Where the system under processing is such that a danger of unusually high solid diffusivity rates exists, it may be necessary to take extra precautions in maintaining a solid temperature substantially below the melting temperature of the system.

Shorter interheater spacing and smaller zone length $l$ both decrease the time necessary to attain steady state conditions. Shorter zone length additionally permits more stages of purification for a given column length.

Due to the high degree of purity control required in the manufacture of semiconductor devices and further due to the increasing quantities of such materials now required, the described processes are particularly useful in the preparation of materials for use in such devices. These materials include the elemental semiconductors such as silicon and germanium and also compounds having such extrinsic semiconductive characteristics, such for example as the binary compounds aluminum phosphide, aluminum arsenide, aluminum antimonide, and other group III–group V and group II–group VI compounds, and also the ternary compounds such for example, as silver antimony selanide, $AgSbSe_2$.

The invention has, of necessity, been described in terms of specific embodiments. Various modifications will be apparent to those skilled in the art. For example, while complete refiners have been discussed, it is evident that refiners with only one section, either rectifying or stripping, in which the feed inlet is adjacent either of the exits can be operated to advantage using the zone transport principle of this invention. It is also evident that reciprocating heater motion may be used, each heater advancing in the forward direction at a prescribed rate for an integral number of zone lengths, whereupon it is rapidly returned to its starting position corresponding, in the event more than one heater is used, with a molten region created by a preceding heater following a similar traversal schedule. For these reasons the description herein is considered to be illustrative only and not to constitute a limitation upon the scope of the invention.

What is claimed is:

1. The process of redistributing ingredients of a fusible material containing at least two ingredients, at least one of which has a segregation coefficient which differs from unity, within a receptacle comprising causing relatively hot and cold regions alternately spaced to progress in one direction through at least a portion of the said material within the receptacle, the temperature of the said hot region being at least as great as the melting point of the said material therein, and the temperature of the cold region being below the melting point of the material therein, removing material at a first position in the receptacle in an amount less than the amount contained within a hot region each time the material at that position is molten and adding, at a second position within the receptacle and at a higher elevation than the said first position, fusible material of the system undergoing treatment in an amount equal to the amount withdrawn, the processing conditions being such that any restraint on the upper surface of the fusible material undergoing treatment is yieldable so that the said withdrawal of material and the said addition of material results in an upper surface of material undergoing treatment which is inclined intermediate the position of withdrawal and the position of addition such that the position of highest elevation of the inclined surface corresponds with the position of addition.

2. The process of claim 1 in which material is withdrawn at a third position at a level such that there is a second inclined surface of the said material undergoing processing with the position of highest elevation corresponding with the position of addition.

3. The process of claim 2 in which material is withdrawn at a fourth position at a level such that the surface of the material undergoing treatment intermediate the fourth position and at least one of the other positions of withdrawal has an inclined surface with its lowest point of elevation corresponding with the fourth position in which the slope of the surface of the material in the vicinity of the said fourth position is opposite to that of the material in the vicinity of the second position, in which the material in the vicinity of the fourth position is physically separated from the material in the vicinity of the second position and in which the said relatively hot and cold regions traverse the material undergoing treatment on both sides of the physical separation.

4. The process of claim 3 in which the material undergoing treatment has two sloped surfaces, one intermediate the first position and the fourth position and one intermediate the third position and the fourth position.

5. The process of claim 1 in which there is at all times within each cold region a sectional plane intersecting the direction of traversal of the said hot regions which is entirely solid.

6. The process of redistributing ingredients of a fusible material containing a major ingredient and at least two minor ingredients in which at least one of the minor ingredients has a segregation coefficient numerically greater than 1 and at least one of the minor ingredients has a segregation coefficient less than 1 within a receptacle having a first outlet port at one end of the receptacle, a second outlet port at an opposite end of the receptacle and a feed inlet position intermediate the outlet ports, comprising causing relatively hot and cold regions alternately spaced to progress through the fusible material in one direction from the first outlet port to the second outlet port, the temperature of the said hot region being at least as great as the melting point of the fusible material therein and the temperature of the cold region being below the melting point of the material therein, and adding material of the system undergoing treatment through the said feed inlet at such a level as to result in an inclination of the surface of the material undergoing treatment in the direction of each of the said outlet ports with the highest point of elevation corresponding with the position of the feed inlet and low elevations corresponding in position and elevation with each of the two outlet ports.

7. The process of claim 6 in which the material undergoing processing is separated into two non-contacting bodies over a substantial length of the receptacle, including the vicinity of the feed inlet, in the direction of hot region traversal and in which there is at least one additional product port in the body of material undergoing processing so separated from the body on the side of the feed inlet, the said additional product port being at such a level that the surface of the material undergoing processing is inclined downwardly in the direction of the said additional port from at least one of the said first and second ports.

8. The process of claim 7 in which the two separate bodies of material undergoing processing are in intimate contact in the vicinity of the said first and second ports and in which the surface of the material undergoing treatment is inclined downwardly to the said additional port from each of the said first and second ports.

9. The process of claim 7 in which the separated bodies of materials undergoing treatment are in intimate contact in the vicinity of only one product port.

No references cited.